Jan. 21, 1958     D. J. BLUNDEN     2,820,665
CARRY CAR TRAILER TRACK STRUCTURE
Filed April 16, 1956     4 Sheets-Sheet 1
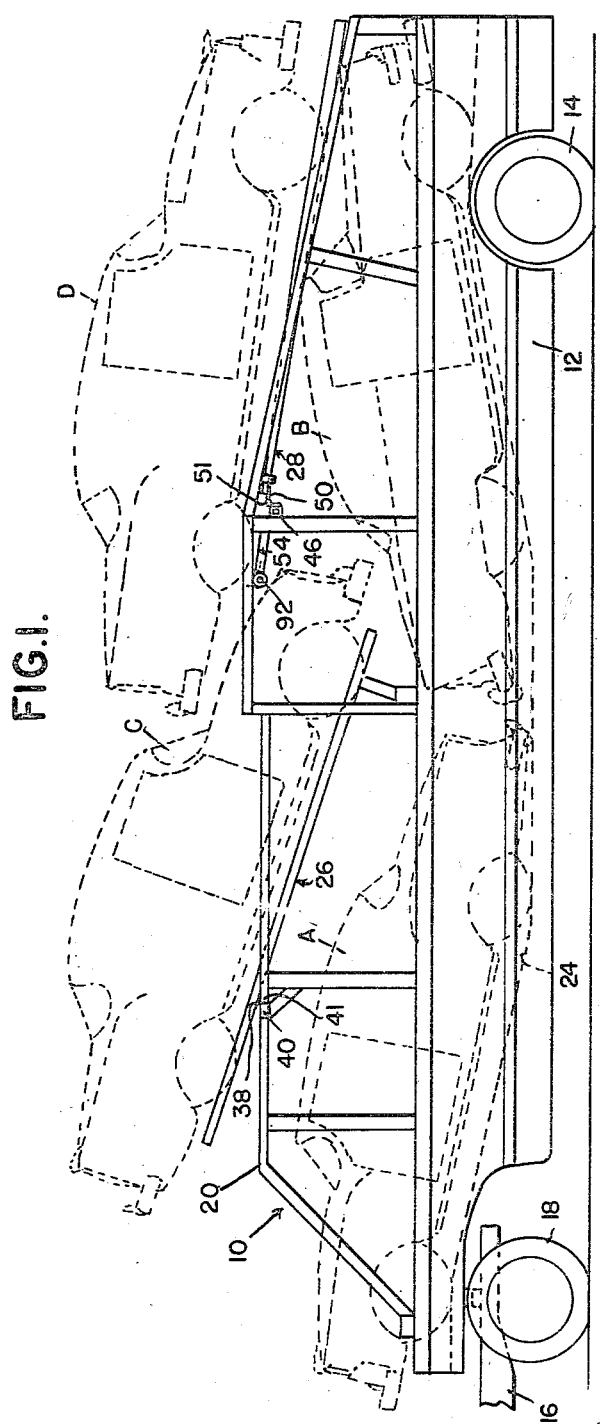
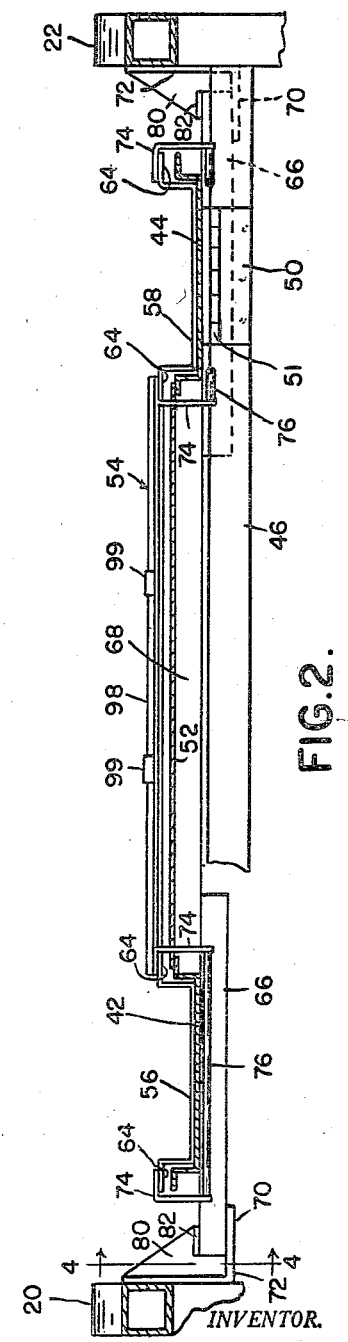
INVENTOR.
DONALD J. BLUNDEN
BY
ATTORNEYS Jan. 21, 1958  D. J. BLUNDEN  2,820,665
CARRY CAR TRAILER TRACK STRUCTURE
Filed April 16, 1956  4 Sheets-Sheet 2

INVENTOR.
DONALD J. BLUNDEN
BY
ATTORNEYS

Jan. 21, 1958 D. J. BLUNDEN 2,820,665
CARRY CAR TRAILER TRACK STRUCTURE
Filed April 16, 1956 4 Sheets-Sheet 3
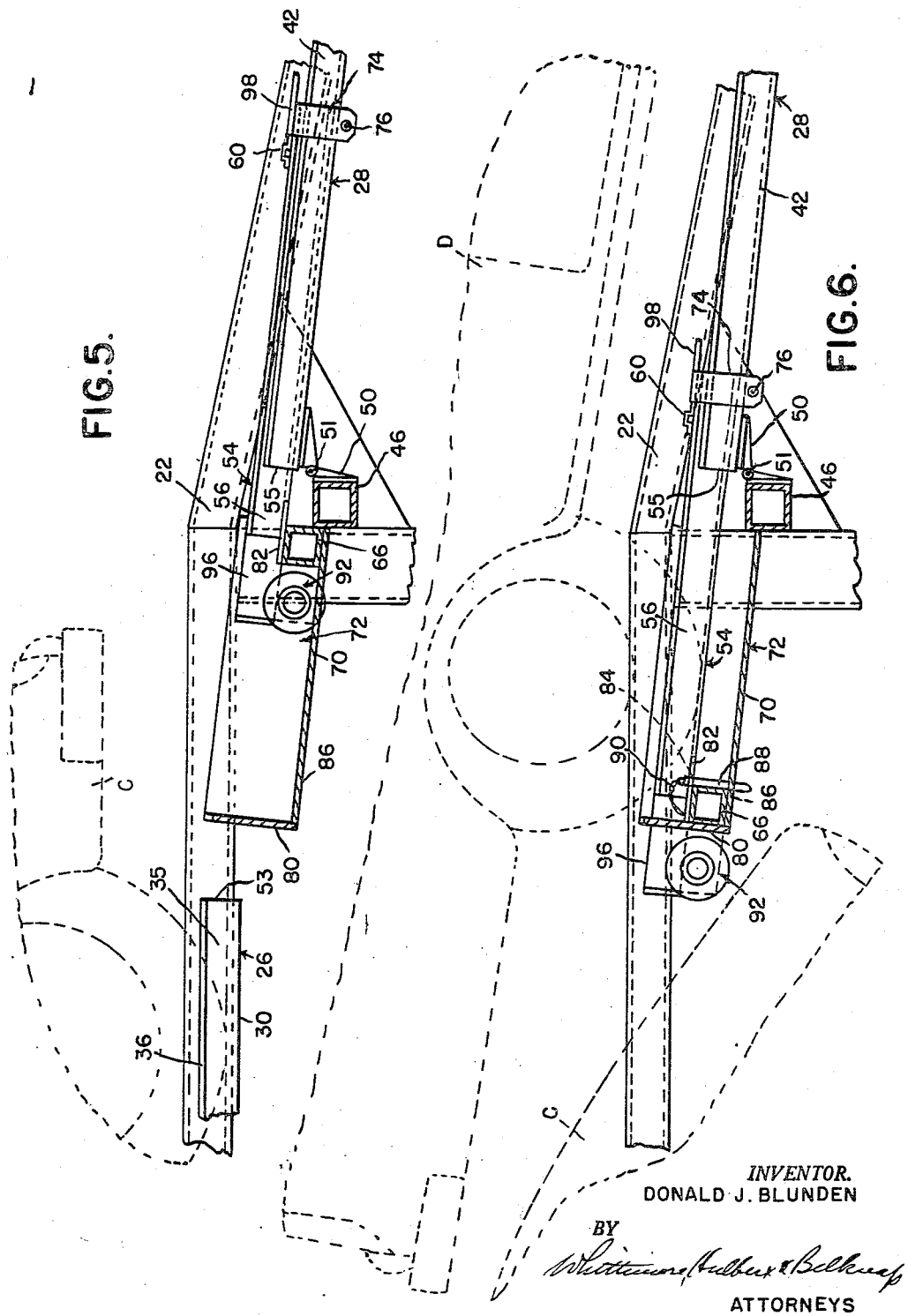
INVENTOR.
DONALD J. BLUNDEN
BY
ATTORNEYS Jan. 21, 1958 D. J. BLUNDEN 2,820,665
CARRY CAR TRAILER TRACK STRUCTURE
Filed April 16, 1956 4 Sheets-Sheet 4

INVENTOR.
DONALD J. BLUNDEN
BY
Whittemore, Hulbert & Belknap
ATTORNEYS

United States Patent Office 2,820,665
Patented Jan. 21, 1958

2,820,665

CARRY CAR TRAILER TRACK STRUCTURE

Donald J. Blunden, Detroit, Mich., assignor to Whitehead & Kales Company, River Rouge, Mich., a corporation of Michigan Application April 16, 1956, Serial No. 578,488

11 Claims. (Cl. 296—1)

This invention relates to carry car trailers and refers more particularly to track structure thereof.

Carry car trailers must be built to conform with rigid government regulations regarding overall length and height. The overall length of two cars supported on a carry car trailer can be substantially reduced if they are carried so as to partially overlap one another and to this end, at least one of the car supporting track sections is supported for movement from an elevated car loading position in alignment with the other car supporting track section to a lowered carrying position in which the cars partially overlap.

The overall length of present day cars from bumper to bumper is substantially greater than the wheel base length and so the car body extends considerably beyond the wheels at both ends. This creates problems in the construction of carry car trailers, particularly where the overlapping relation referred to above is desired. When the track sections are in alignment, the adjacent ends must be very close to one another to provide a continuous track for the movement of a car from one track section to the other. However, when one of the track sections is movable to a lowered position with respect to the other, provision must be made for clearing the bumper of the car supported on the one track section with the other track section.

One object of this invention is to provide a carry car trailer having a deck comprising three permanently mounted track sections adapted when in a predetermined position to provide lengthwise of the vehicle a continuous track onto which one or more cars may be loaded.

Another object is to provide a track structure of the type mentioned wherein two of the track sections are spaced apart lengthwise of the vehicle and are mounted for movement independently of each other from an elevated position to a lowered position and wherein the third track section is intermediate the two spaced track sections and is mounted to move independently relative to said two spaced track sections to two positions, one of said positions permitting a car on one of said two track sections to move therewith without colliding with the third track section, and the other of said positions permitting said third track section to form an endwise extension of the other of said two track sections whereby two wheels of a car may be carried by said other track section and two wheels of said car may be carried by the third track section.

Another object is to provide a track structure having means for guiding the third track section during movement thereof between said two positions.

Another object is to provide a track structure having means operable when said third section reaches either of said two positions for limiting movement of said third section.

Another object is to provide a track structure having means for holding said third section in one of the two positions mentioned.

Another object is to provide a track structure having means for retaining the third track section in telescopic relation with one of the other two track sections mentioned.

Other objects of the invention will become apparent as the following description proceeds, especially when considered with the accompanying drawings, wherein:

Figure 1 is a semi-diagrammatic view in side elevation of a loaded carry car trailer embodying the present invention.

Figure 2 is a sectional view taken along the line 2—2 on Figure 4.

Figure 5 is a view similar to Figure 4 but showing the additional track section in another position.

Figure 6 is similar to Figures 4 and 5 and shows the parts in another position.

Figures 3, 4:
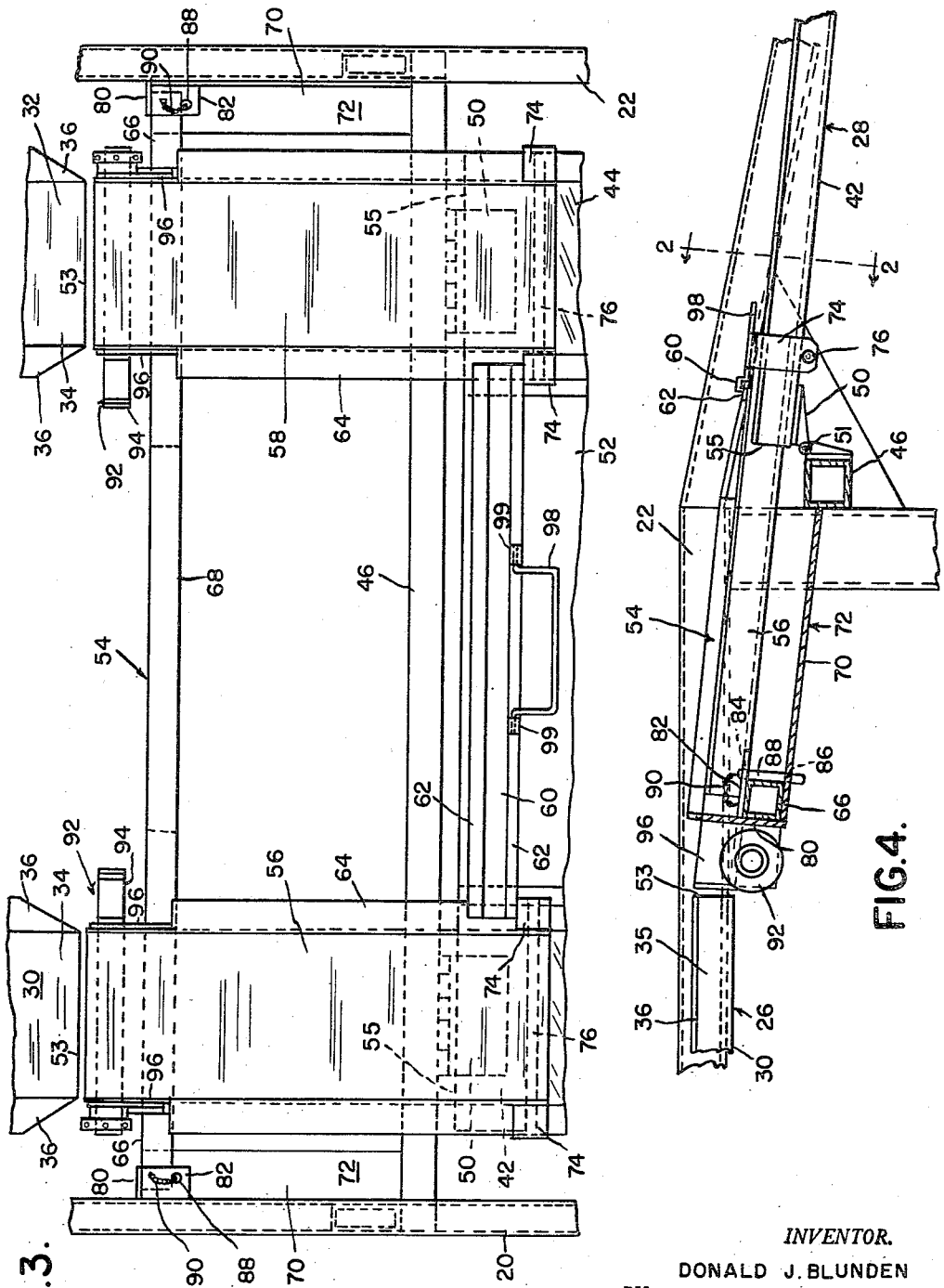
Figure 3 is a fragmentary plan view of a portion of the structure including the movable additional track section.
Figure 4 is an enlarged view of a portion of Figure 1 with parts of the trailer frame structure broken away, and taken along the line 4—4 on Figure 2.

Referring now more particularly to Figures 1–6 of the drawings and especially to Figure 1 thereof, the carry car trailer is generally indicated at 10 and comprises a trailer body 12 having a pair of ground engaging wheels 14 supporting the rear end of the body, and having the front end portion suitably connected to the rear end of a tractor 16. The tractor rear wheels are indicated at 18.

The trailer body 12 has a rigid upright frame structure comprising two laterally spaced longitudinally extending upright frames 20 and 22. Between these frames 20 and 22 is a lower deck 24 which extends from the front to the rear end of the trailer body for supporting two cars A and B thereon in tandem relation. The lower deck may be of any suitable construction.

The trailer is provided with an upper deck for carrying cars C and D above those on the lower deck. The upper deck comprises three track sections 26, 28 and 54. The track sections 26 and 28 are spaced longitudinally apart and are located between and pivotally supported from the upright side frames 20 and 22. The foremost track section 26 comprises a pair of laterally spaced parallel track members 30 and 32 which extend longitudinally of the trailer. Each track member may have any suitable cross-section as desired, but are preferably either channel or Z-shaped. In the present instance, as shown in Figures 1–6, each track member is of generally channel shape, the base 34 of the channel shaped track members supporting the wheels of a car, and the upstanding side flanges 35 at either side of the base laterally confining the wheels. Flanges 36 extend laterally outwardly from the upper extremities of the side flanges.

The lateral spacing between the track members is, of course, in accordance with the lateral spacing of the wheels on a standard car.

The foremost track section 26 is pivoted for vertical swinging movement on the cross frame member 40. Frame member 40 extends between the skeleton frames 20 and 22 and has hinges 41 thereon, respectively pivotally mounting the track members 30 and 32 on the cross frame member 40, the horizontal axes 38 of the hinges being in alignment with each other and extending transversely of the trailer. The track sections are, of course, rigidly interconnected by any suitable means (not shown) for constraining them to move as a unit.

The rearmost track section 28 comprises a pair of laterally spaced parallel track members 42 and 44 which extend longitudinally of the trailer. The track members 42 and 44 may be of any suitable cross-section as desired and are not necessarily of the same cross-section as the track members 30 and 32. Preferably, they will be of either channel or Z-shape. As shown in Figures 1-6, the track members 42 and 44 are of the same cross sectional shape as the track members 30 and 32 and the spacing between them is the same. The rearmost track section 28 is pivotally supported for vertical swinging movement on the cross frame member 46 which extends between the skeleton frames 20 and 22. Specifically, a pair of hinges 50 each have one hinge leaf secured to the cross member 46 and the other hinge leaf secured to a track member of the rearmost track section, the horizontal axes 51 of the hinges being aligned with each other and extending transversely of the trailer. The track members 42 and 44 are rigidly interconnected for movement as a unit, and a drip pan 52 is secured to and extends between the track members. A similar drip pan (not shown) extends between the track members of the foremost track section 26.

The rearmost track section 28 is movable about its pivot from an elevated substantially horizontal position for enabling the cars A and B to be loaded on the lower deck through the open rear end of the trailer to a lowered position shown in Figures 1, 4, 5 and 6. The lowered position of the rear track section is the normal position it assumes when loaded for transit and is also the position it assumes for moving a car from one to the other of the track sections 26 and 28. The foremost track section 26 is movable about its pivot from an elevated car loading position shown in Figures 4 and 5 to a lowered position which it assumes when loaded for transit shown in Figure 1. When in its elevated car loading position, track section 26 is in substantial alignment with the forward end of the rearmost track section when the latter is in its car loading position. In other words, the track members 30 and 32 of the foremost track section are in substantial alignment with the forward ends of the track members 42 and 44 of the rearmost track section. However, it will be seen that in the car loading positions of the track sections, there is a substantial gap between the forward end of the rearmost track section and the rear end of the foremost track section 26 (see Figures 4 and 5). The track section 54 is intermediate and is adapted to span the space or gap between the adjacent ends 53 and 55 of the longitudinally spaced track sections 26 and 28 in the car loading positions thereof. The intermediate track section 54 is operable as an endwise extension of the forward end of the rearmost track section 28. The intermediate track section 54 is slidable in a forward direction relative to the rearmost track section 28 to an extended position in juxtaposition to the rear end 53 of the foremost track section 26 when the latter is in elevated car loading position and is slidable in the opposite direction to provide clearance for a car loaded on the foremost track section 26 when the latter is moved between raised and lowered positions, as shown in Figure 5.

The intermediate track section 54 comprises a pair of laterally spaced parallel track members 56 and 58 which may be of any suitable cross-section as desired although usually taking the general shape of the track members of the rearmost track section 28. In the present instance, track members 56 and 58 are of the same generally channel shaped cross-section as the track members 42 and 44, although as seen in Figure 2, the channels of the members 56 and 58 are somewhat deeper. The track members 56 and 58 are respectively slidably supported upon the top surfaces of the bases of the channels of track members 42 and 44 and constitute extensions thereof. The track members 56 and 58 are interconnected at their rear ends by any suitable means, and in the present instance, by a transverse member 60. The member 60 may have any suitable cross-section such as the channel shape shown having flanges 62 extending laterally outwardly from the extremities of the side flanges of the channel member which are secured directly to the flanges 64 of the track members 56 and 58.

A bar 66 is secured to the bottom of and extends transversely of the front end portion of each track member 56 and 58 of the intermediate track sections 54. Bars 66, preferably tubular in form and square shaped in cross-section, may be of other suitable forms and cross-sections as desired. These bars are aligned with each other and are interconnected by an intermediate bar 68 preferably of similar shape which is secured to the tops of the adjacent inner ends of the bars 66 and has its opposite ends abutting the adjacent side flanges of the track members 56 and 58. Thus, the bars 66 and 68 rigidly interconnect the forward end portions of the track members 56 and 58, and the channel member 60 rigidly interconnects the rearmost end portions thereof.

The laterally outwardly extending extremities of the bars 66 are supported on slideways 70 which are preferably formed of laterally inwardly directed flanges of the angle plates 72 which are respectively secured to the upright frames 20 and 22 at opposite sides of the trailer. Slideways 70 lie in a common plane parallel to the plane of the rearmost track section 28 when the latter is in its position of Figures 1, 4, 5 and 6. The bars 66 slidably engage the slideways 70 to support the forward end portion of the intermediate track section 54 as it moves forwardly and rearwardly between the extended or spanning position of Figures 4 and 6 and the retracted position of Figure 5. As seen in Figures 3, 4 and 6, the forward ends of the track members 56 and 58 are aligned with and in juxtaposition to the rear ends 53 of the foremost track members 30 and 32 when the foremost track section 26 is in its elevated car loading position.

Suitable means are provided to retain the intermediate track 54 in assembled telescopic relation with the rearmost track section 28, and in the present instance such means comprises L-shaped ears 74 on the track members 56 and 58 of the intermediate track section 54, the lateral flanges of said ears being secured to the top surfaces of the laterally outwardly extending flanges 64 of the track members 56 and 58, and the depending flanges of the ears extending below the track members 42 and 44. Pins 76 extend between the lower extremities of the depending flanges of the ears 74 and beneath the track members 42 and 44 of the rearmost track section 28 to prevent the intermediate track section 54 from being removed from the rearmost track section 28.

The limit of forward movement of the intermediate track section 54 is determined by plates 80 secured to the slideway angle plates 72 at the forward ends thereof in positions to be engaged by the transverse bars 66. The limit of rearward or retraction movement of the intermediate track section is determined by the engagement of the bars 66 with the transverse frame member 46, as shown in Figure 5. It will be noted that the inwardly directed flanges or slideways 70 of the angle plates 72 extend parallel with the rearmost track section 28 in its lower car loading position illustrated so that the intermediate track section 54 will move generally in the plane of the rearmost track section during its forward and rearward movement.

Suitable means are provided to hold the intermediate track section 54 in its extended position. In the present instance, the bars 66 have plates 82 secured to their top surfaces at the outer extremities thereof, these plates being provided with openings 84, respectively aligned with openings 86 in the slideways 70 in the fully extended position of the additional track section. A pin 88 is carried by each plate 82, being connected thereto by a flexible member 90, and the pin is adapted to be inserted through the openings 84 and 86 in the extended position of the intermediate track section 54 to hold it in its extended position.

The track members of the intermediate track section 54 are each provided with tie-down devices 92 which comprise shafts 94 rotatably carried by the track members at the forward ends thereof by brackets 96. The laterally outwardly extending flanges 64 are cut away at the front ends to accommodate brackets 96. Cables or chains may be wound upon the shafts 94 and are employed for attachment with the body of the automobile supported thereon to hold it against movement.

A handle 98 is provided for manually moving the intermediate track section 54 between the retracted and extended or spanning positions. The handle is secured to the cross member 60 by brackets 99.

The operation of the apparatus should be apparent from the foregoing. In order to load the trailer, the foremost track section 26 is elevated to its car loading position shown in Figures 3, 4 and 5 and the rearmost track section 28 is swung upwardly sufficiently so that it will clear a car being moved onto the lower deck of the trailer from the rear. First car A and then car B is driven or backed onto the lower deck through the open rear end of the trailer. Skids (not shown) may be employed to provide a ramp between the ground and the rear end of the lower deck, or the lower deck may be loaded directly from a loading dock having the same level as the lower deck.

Thereafter, the rear track section 28 is swung downwardly to the position illustrated in Figure 1 which is both the car loading position and the position thereof for supporting a car in transit. The foremost track section 26 will remain in elevated car loading position substantially in alignment with the forward end of the rearmost track section 28. In order to span the space between the rear end of the foremost track section and the forward end of the rearmost track section, the intermediate track section 54 is moved forwardly to its fully extended or spanning position shown in Figure 4 in which its forward end of said intermediate track section 54 is in juxta-position to the rear end of the foremost track section 26. The car C is then driven or backed onto the rearmost track section 28, thence across the intermediate track section 54 onto the foremost track section 26. Suitable skids (not shown) may be provided to span the space between the rear ends of the rearmost track section 28 and the ground. Thereafter, the car C is tied down, as were cars A and B.

The foremost track section 26 is then swung down to the lowered or carrying position shown in Figure 1. The intermediate track section 54 is retracted prior to the downward movement of the foremost track section 26 to permit the car C carried by the foremost track section 26 to move therewith from a raised loading position to a lowered car carrying position without colliding with the intermediate track section 54. Thereafter, the intermediate track section 54 is extended fully to the position shown in Figure 6. The car D is then driven or backed onto both the rear track section 28 and the intermediate track section 54 and is tied down. It will be noted in Figure 1 that one set of wheels of the car D rests on the rearmost track section 28 while the other set of wheels of the car D rests on the extended intermediate track section 54, whereby the intermediate track section 54 cooperates with the rearmost track section 28 to carry the load of said car D while the carry car vehicle is in transit.

Any suitable means may be provided for holding the track sections 26 and 28 in their elevated and lowered positions.

It should be pointed out that the intermediate track section 54 does not interfere with the upward swinging of the rearmost track section 28 at any time.

Figure 7:
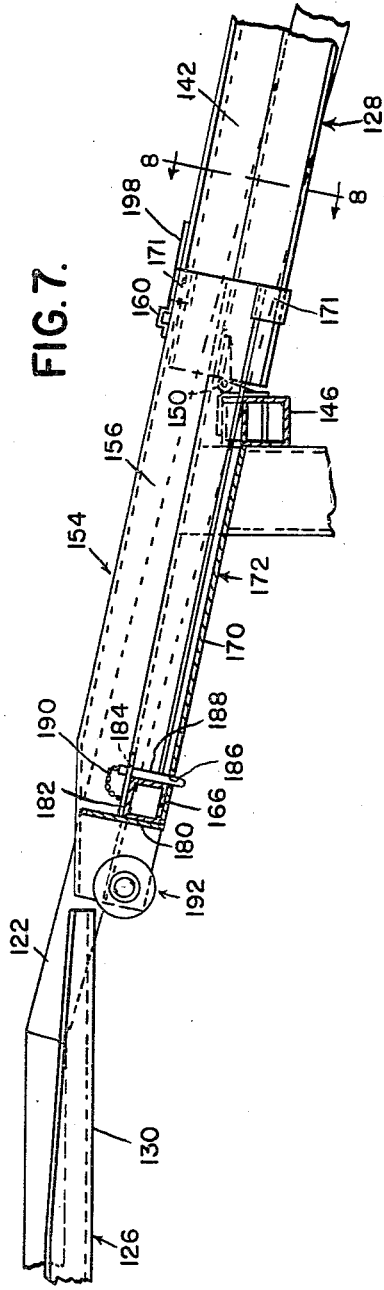
Figure 7 is a view partly in section similar to Figure 4 and showing a modified construction, being taken along the line 7—7 on Figure 8.
Figure 8:
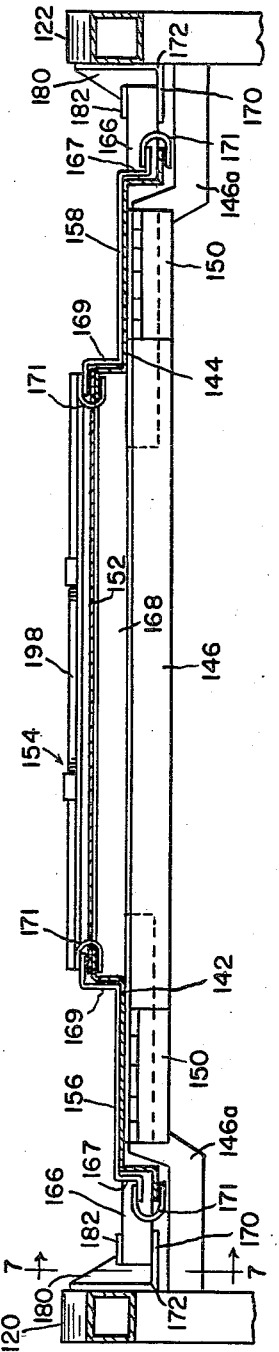
Figure 8 is a sectional view taken along the line 8—8 on Figure 7.

Figures 7 and 8 show an upper deck track structure having a modified construction. The principle difference between the upper deck track structure shown in Figures 7 and 8 and that shown in Figures 1–6 is in the cross-sectional shape of the track members of the intermediate track section 154 and the rearmost track section 128.

The foremost track section 126 is only partially shown and is mounted on the trailer frame structure for pivotal movement in the same manner as the foremost track section 26 shown in Figures 1–6. The laterally spaced track members 130 of the foremost track section (only one of which is shown) are of generally channel shape although other cross-sectional configurations may be employed as desired.

The rearmost track section 128 is mounted on the frame structure of the trailer for pivotal movement in the same manner as the rearmost track section 28 shown in Figures 1–6 and is arranged in longitudinally spaced relation to the foremost track section 126. The track members 142 and 144 of the rearmost track section are generally Z-shaped as best seen in Figure 8, and this is the principle difference between the rearmost track section 128 and the one shown in Figures 1–6. The base of each track member is pivotally connected by hinges 150 to the cross frame member 146, which extends between the upright frames 120 and 122. As in the construction of Figures 1–6, the track members 130 of the foremost track section, when in the elevated loading position illustrated, are generally aligned with but spaced from the forward ends of the track members 142 and 144. A drip pan 152 extends between track members 142 and 144.

The intermediate track section 154 is substantially the same as the one shown in Figures 1–6 except that the track members 156 and 158 thereof have generally the same Z-shaped configuration as the track members of the rearmost track section 128, as best seen in Figure 8. The bases of the track members 156 and 158 are respectively slidably supported on the bases of the track members 142 and 144. The bars 166, similar to bars 66 described in Figures 1–6, are secured to the bottoms of the bases of track members 156 and 158 and their laterally outer extremities slidably engage the slideways 170 which constitute flanges of angle plates 172 respectively secured to the frames 120 and 122. Slideways 170 lie in a common plane generally parallel to the rearmost track section when the latter is in the position shown. Bar 168 is rigidly secured to the inner ends of bars 166 to interconnect them. The laterally outer depending flanges 167 of the track members 156 and 158 are cut away at the front ends to clear the bars 166. The rear portions of the track members 156 and 158 are interconnected by a member 160 which has its outer ends secured to the laterally inturned extremities of the upstanding flanges 169 at the inner sides of the track members. Handle 198 is carried by member 160.

The laterally outwardly turned extremities of the depending flanges 167 of the track members 156 and 158 have secured thereto C-shaped clips 171, and similar C-shaped clips are secured to the laterally inturned extremities of the upstanding flanges 169. The clips extend beneath the corresponding portions of the track members 142 and 144 to retain the intermediate track section 154 in assembled telescopic relation with the rearmost track section 128.

In its extended or spanning position, limited by the engagement of bars 166 with plates 180 carried by the angle plates 172, the forward ends of the track members 156 and 158 of the intermediate track section 154 are in juxtaposition to the rear ends of the track members of the foremost track section 126 to permit a car to be moved between the foremost and rearmost track sections 126 and 128 when they are in the loading position illustrated. The intermediate track section 154 may be retracted or moved rearwardly to a position determined by engagement of bars 166 with the intermediate portion of frame member 146. The ends of frame member 146 are offset downwardly at 146a to clear the intermediate track section 154. When retracted, the intermediate track section 154 will clear the bumper of a car loaded on the foremost section 126 when the latter moves from the loading position shown in Figure 7 to a lowered carrying position.

Pins 188 are connected by chains 190 to plates 182 on bars 166 to extend through aligned holes 184 and 186 in the plates 182 and in slideways 170 to hold the intermediate track section 154 extended as shown in Figure 7. Tie-down device 192 is carried by the front ends of track members 156 and 158.

As in the construction of Figures 1–6, the intermediate track section 154 will not interfere with the upward swinging of the rearmost track section 128 at any time.

It will be understood that other vehicles, such as trucks, may be carried by the track structure as well as the passenger automobiles illustrated. The term "cars" employed in the specification and claims is intended to include within its meaning all such vehicles and is not to be understood as limited to passenger automobiles.

What I claim as my invention is:

1. A carry car vehicle having three permanently mounted track sections adapted when in a predetermined position to provide lengthwise of the vehicle a continuous track onto which one or more cars may be loaded, two of said track sections being spaced apart lengthwise of the vehicle and mounted for movement independently of each other from an elevated position to a lowered position, one of said two track sections being long enough to carry thereon four wheels of a car, the third of said track sections being intermediate the two spaced track sections and being movable in one direction lengthwise of the vehicle relative to said two spaced track sections to a position permitting a car on said one track section to move therewith without colliding with said third track section and movable in the opposite direction lengthwise of the vehicle relative to said two spaced track sections to a position forming an endwise extension of the other of said two track sections, whereby two wheels of a second car may be carried by said other track section and two wheels of said second car may be carried by said third track section.

2. A carry car vehicle having a deck comprising three permanently mounted track sections adapted when in a predetermined position to provide lengthwise of the vehicle a continuous track onto which one or more cars may be loaded, two of said track sections being spaced apart lengthwise of the vehicle and pivotally mounted for movement independently of each other from an elevated position to a lowered position, one of said two track sections being long enough to carry thereon four wheels of a car, the third of said track sections being intermediate the two spaced track sections and being slidable in one direction relative to said two spaced track sections to a position permitting a car on said one track section to move therewith without colliding with said third track section and slidable in the opposite direction relative to said two spaced track sections to a position forming an endwise extension of the other of said two track sections, whereby two wheels of a second car may be carried by said other track section and two wheels of said second car may be carried by said third track section.

3. A carry car vehicle having three permanently mounted track sections adapted when in a predetermined position to provide lengthwise of the vehicle a continuous track onto which one or more cars may be loaded, two of said track sections being spaced apart lengthwise of the vehicle and mounted for movement independently of each other from an elevated position to a lowered position, one of said two track sections being long enough to carry thereon four wheels of a car, the third of said track sections being intermediate the two spaced track sections and being mounted to move independently relative to said two spaced track sections to two positions, one of said positions permitting a car on said one track section to move therewith without colliding with said third track section and the other of said two positions permitting said third track section to form in the opposite direction relative to said two spaced track sections an endwise extension of the other of said two track sections, whereby two wheels of a second car may be carried by said other track section and two wheels of said second car may be carried by said third track section.

4. A carry car vehicle having a pair of rigidly mounted laterally spaced upright side frames, three track sections between said side frames and adapted when in a predetermined position to provide lengthwise of the vehicle a continuous track onto which one or more cars may be loaded, two of said track sections being spaced apart lengthwise of the vehicle and mounted on said side frames for movement independently of each other from an elevated position to a lowered position, the third of said track sections being intermediate the two spaced track sections and being movable independently relative to said two spaced track sections to two positions, one of said positions permitting a car on one of said two track sections to move therewith without colliding with said third section, the other of said two positions permitting said third track section to form an endwise extension of the other of said two track sections, whereby two wheels of a car may be carried by said other section and two wheels of said car may be carried by said third section.

5. A carry car vehicle having a pair of rigidly mounted laterally spaced upright side frames, three track sections between said side frames and adapted when in a predetermined position to provide lengthwise of the vehicle a continuous track onto which one or more cars may be loaded, two of said track sections being spaced apart lengthwise of the vehicle and mounted on said side frames for movement independently of each other from an elevated position to a lowered position, the third of said track sections being intermediate the two spaced track sections and being slidable independently relative to said two spaced track sections to two positions, one of said positions permitting a car on one of said two track sections to move therewith without colliding with said third section, the other of said two positions permitting said third track section to form an endwise extension of the other of said two track sections, whereby two wheels of a car may be carried by said other section and two wheels of said car may be carried by said third section, and slideways for said third section carried by said upright side frames and adapted to guide said third section during sliding movement thereof between said two positions.

6. A carry car vehicle having a pair of rigidly mounted laterally spaced upright side frames, three track sections between said side frames and adapted when in a predetermined position to provide lengthwise of the vehicle a continuous track onto which one or more cars may be loaded, two of said track sections being spaced apart lengthwise of the vehicle and mounted on said side frames for movement independently of each other from an elevated position to a lowered position, the third of said track sections being intermediate the two spaced track sections and being slidable independently relative to said two spaced track sections to two positions, one of said positions permitting a car on one of said two track sections to move therewith without colliding with said third section, the other of said two positions permitting said third track section to form an endwise extension of the other of said two track sections, whereby two wheels of a car may be carried by said other section and two wheels of said car may be carried by said third section, and means for retaining said third track section in telescopic relation with the other of said two track sections.

7. A carry car vehicle having a pair of rigidly mounted laterally spaced upright side frames, three track sections between said side frames and adapted when in a predetermined position to provide lengthwise of the vehicle a continuous track onto which one or more cars may be loaded, two of said track sections being spaced apart lengthwise of the vehicle and mounted on said side frames for movement independently of each other from an elevated position to a lowered position, the third of said track sections being intermediate the two spaced track sections and being slidable independently relative to said two spaced track sections to two positions, one of said positions permitting a car on one of said two track sections to move therewith without colliding with said third section, the other of said two positions permitting said third track section to form an endwise extension of the other of said two track sections, whereby two wheels of a car may be carried by said other section and two wheels of said car may be carried by said third section, and means for guiding said third section during sliding movement thereof between said two positions.

8. A carry car vehicle having a pair of rigidly mounted laterally spaced upright side frames, three track sections between said side frames and adapted when in a predetermined position to provide lengthwise of the vehicle a continuous track onto which one or more cars may be loaded, two of said track sections being spaced apart lengthwise of the vehicle and mounted on said side frames for movement independently of each other from an elevated position to a lowered position, the third of said track sections being intermediate the two spaced track sections and being slidable independently relative to said two spaced track sections to two positions, one of said positions permitting a car on one of said two track sections to move therewith without colliding with said third section, the other of said two positions permitting said third track section to form an endwise extension of the other of said two track sections, whereby two wheels of a car may be carried by said other section and two wheels of said car may be carried by said third section, means for guiding said third section during sliding movement thereof between said two positions, and means carried by said upright frames and operable when said third section reaches either of said two positions for limiting sliding movement of said third section.

9. A carry car vehicle having a pair of rigidly mounted laterally spaced upright side frames, three track sections between said side frames and adapted when in a predetermined position to provide lengthwise of the vehicle a continuous track onto which one or more cars may be loaded, two of said track sections being spaced apart lengthwise of the vehicle and mounted on said side frames for movement independently of each other from an elevated position to a lowered position, the third of said track sections being intermediate the two spaced track sections and being slidable independently relative to said two spaced track sections to two positions, one of said positions permitting a car on one of said two track sections to move therewith without colliding with said third section, the other of said two positions permiting said third track section to form and endwise extension of the other of said two track sections, whereby two wheels of a car may be carried by said other section and two wheels of said car may be carried by said third section, and means for holding said third section in one of the two positions aforesaid.

10. A carry car vehicle having a pair of rigidly mounted laterally spaced upright side frames, three track sections between said side frames and adapted when in a predetermined position to provide lengthwise of the vehicle a continuous track onto which one or more cars may be loaded, two of said track sections being spaced apart lengthwise of the vehicle and mounted on said side frames for movement independently of each other from an elevated position to a lowered position, the third of said track sections being intermediate the two spaced track sections and being slidable independently relative to said two spaced track sections to two positions, one of said positions permitting a car on one of said two track sections to move therewith without colliding with said third section, the other of said two positions permitting said third track section to form and endwise extension of the other of said two track sections, whereby two wheels of a car may be carried by said other section and two wheels of said car may be carried by said third section, slideways for said third section carried by said upright side frames and adapted to guide said third section during sliding movement thereof between said two positions, a plate carried by said third section, and means for holding said third section in one of the two positions aforesaid including a pin engageable with registering openings in said plate and one of said slideways.

11. A carry car vehicle having a pair of rigidly mounted laterally spaced upright side frames, three track sections between said side frames and adapted when in a predetermined position to provide lengthwise of the vehicle a continuous track onto which one or more cars may be loaded, two of said track sections being spaced apart lengthwise of the vehicle and mounted on said side frames for movement independently of each other from an elevated position to a lowered position, the third of said track sections being intermediate the two spaced track sections and being slidable independently relative to said two spaced track sections to two positions, one of said positions permitting a car on one of said two track sections to move therewith without colliding with said third section, the other of said two positions permitting said third track section to form an endwise extension of the other of said two track sections, whereby two wheels of a car may be carried by said other section and two wheels of said car may be carried by said third section, and means for guiding said third section during sliding movement thereof between said two positions, including slideways carried by said upright side frames, and lateral projections on said third section supported upon and slidably engaging said slideways.

References Cited in the file of this patent

UNITED STATES PATENTS

| | | |
|---|---|---|
| 2,647,010 | Huebshman | July 28, 1953 |
| 2,750,225 | Mettetal | June 12, 1956 |